US011222658B1

(12) United States Patent
Wernow et al.

(10) Patent No.: US 11,222,658 B1
(45) Date of Patent: Jan. 11, 2022

(54) POWER LATENCY CONTROL IN DATA STORAGE DEVICES

(71) Applicant: Seagate Technology LLC, Fremont, CA (US)

(72) Inventors: Josiah Natan Wernow, Minneapolis, MN (US); Raye A. Sosseh, Minneapolis, MN (US); Colin Graham Presly, Shakopee, MN (US); Mark A. Gaertner, Shakopee, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/075,337

(22) Filed: Oct. 20, 2020

(51) Int. Cl.
*G11B 5/55* (2006.01)
*G11B 5/48* (2006.01)

(52) U.S. Cl.
CPC .......... *G11B 5/5547* (2013.01); *G11B 5/4813* (2013.01); *G11B 5/4833* (2013.01); *G11B 5/5578* (2013.01)

(58) Field of Classification Search
None
See application file for complete search history.

(56) References Cited

U.S. PATENT DOCUMENTS

| | | |
|---|---|---|
| 5,452,277 A | 9/1995 | Bajorek et al. |
| 5,774,292 A | 6/1998 | Georgiou et al. |
| 6,809,896 B2 | 10/2004 | Espeseth et al. |
| 6,987,639 B1 | 1/2006 | Yu |
| 7,003,644 B2 | 2/2006 | Heath et al. |
| 7,061,714 B1 | 6/2006 | Yu |
| 7,199,966 B1 | 4/2007 | Tu et al. |
| 7,872,825 B2 | 1/2011 | Sanghvi |
| 8,072,704 B1 | 12/2011 | Goldberg et al. |
| 8,364,992 B2 | 1/2013 | Guthrie et al. |
| 8,654,477 B2 | 2/2014 | Sosseh |
| 8,902,539 B1 | 12/2014 | Liu et al. |

(Continued)

FOREIGN PATENT DOCUMENTS

EP 2176864 B1 4/2011

OTHER PUBLICATIONS

He, Henry, "Storage: How 'tail latency' impacts customer-facing applications", Virtual Instruments, Published Aug. 13, 2019, https://www.computerweekly.com/opinion/Storage-How-tail-latency-impacts-customer-facing-applications, downloaded Oct. 20, 2020, 3 pages.

*Primary Examiner* — Craig A. Renner
(74) *Attorney, Agent, or Firm* — Westman, Champlin & Koehler, P.A.

(57) ABSTRACT

A data storage device includes at least one data storage medium having a plurality of tracks. The data storage device also includes at least one actuator that supports at least one head that is configured to interact with different tracks of the plurality of tracks on the at least one data storage medium to service commands from a host. The data storage device further includes a seek control circuit communicatively coupled to the at least one actuator. The seek control circuit is configured to store the commands from the host in at least one queue for execution by the at least one actuator. The seek control module is also configured to adjust power provided to the at least one actuator for seek operations to the different tracks of the plurality of tracks based on command age-related measurements of the commands from the host.

20 Claims, 12 Drawing Sheets

(56) References Cited

U.S. PATENT DOCUMENTS

| | | |
|---|---|---|
| 9,208,815 B1 | 12/2015 | Lou et al. |
| 9,275,667 B1 | 3/2016 | Abrishamchian et al. |
| 9,541,988 B2 | 1/2017 | Khatib et al. |
| 9,965,206 B2 | 5/2018 | Bass, Jr. et al. |
| 10,146,293 B2 | 12/2018 | Khatib et al. |
| 10,310,923 B1 * | 6/2019 | DeRosa et al. ....... G06F 3/0679 |
| 10,372,185 B2 | 8/2019 | Lester et al. |
| 10,387,078 B1 | 8/2019 | Benisty |
| 10,692,519 B1 | 6/2020 | McGrath |
| 2010/0142075 A1 | 6/2010 | Sanghvi |

* cited by examiner

NO ENERGY LIMIT AND AGE <1

| | COMMAND NUMBER | PRESENT AGE | ARRIVAL TIME | CCT | SEEK ENERGY |
|---|---|---|---|---|---|
| CURRENT | 1 | 0.5 | 0.38 | 0.9 | 4.0 |
| CURRENT | 2 | 0.1 | 0.92 | 1.0 | 1.2 |
| FUTURE | 3 | -0.1 | 1.33 | 1.2 | 0.6 |
| FUTURE | 4 | -0.2 | 2.56 | 2.4 | 1.2 |
| AVERAGE | | | | 1.4 | 1.8 |
| TAIL | | | | 2.4 | 4.0 |

FIG. 3A

ENERGY LIMIT = 3 AND AGE <1

| | COMMAND NUMBER | PRESENT AGE | ARRIVAL TIME | CCT | SEEK ENERGY |
|---|---|---|---|---|---|
| CURRENT | 2 | 0.2 | 0.92 | 1.1 | 1.3 |
| FUTURE | 3 | -0.1 | 1.77 | 1.7 | 0.1 |
| CURRENT | 1 | 0.5 | 2.38 | 2.9 | 1.2 |
| FUTURE | 4 | -0.2 | 3.56 | 3.4 | 1.0 |
| AVERAGE | | | | 2.3 | 0.9 |
| TAIL | | | | 3.4 | 1.3 |

FIG. 3B

NO ENERGY LIMIT AND AGE <1

|  | COMMAND NUMBER | PRESENT AGE | ARRIVAL TIME | CCT | SEEK ENERGY |
|---|---|---|---|---|---|
| CURRENT | 1 | 0.5 | 0.38 | 0.9 | 4.0 |
| CURRENT | 2 | 0.1 | 0.92 | 1.0 | 1.2 |
| FUTURE | 3 | -0.1 | 1.33 | 1.2 | 0.6 |
| FUTURE | 4 | -0.2 | 2.56 | 2.4 | 1.2 |
| AVERAGE |  |  |  | 1.4 | 1.8 |
| TAIL |  |  |  | 2.4 | 4.0 |

FIG. 4A

NO ENERGY LIMIT AND AGE >2

|  | COMMAND NUMBER | PRESENT AGE | ARRIVAL TIME | CCT | SEEK ENERGY |
|---|---|---|---|---|---|
| CURRENT | 1 | 2.5 | 0.38 | 2.9 | 4.0 |
| CURRENT | 2 | 0.2 | 0.92 | 1.1 | 1.2 |
| FUTURE | 3 | -0.1 | 1.33 | 1.2 | 0.6 |
| FUTURE | 4 | -0.2 | 2.56 | 2.4 | 1.2 |
| AVERAGE |  |  |  | 1.9 | 1.8 |
| TAIL |  |  |  | 2.9 | 4.0 |

FIG. 4B

ENERGY LIMIT = 3 AND AGE <1

|  | COMMAND NUMBER | PRESENT AGE | ARRIVAL TIME | CCT | SEEK ENERGY |
|---|---|---|---|---|---|
| CURRENT | 2 | 0.2 | 0.92 | 1.1 | 1.3 |
| FUTURE | 3 | -0.1 | 1.77 | 1.7 | 0.1 |
| CURRENT | 1 | 0.5 | 2.38 | 2.9 | 1.2 |
| FUTURE | 4 | -0.2 | 3.56 | 3.4 | 1.0 |
| AVERAGE |  |  |  | 2.3 | 0.9 |
| TAIL |  |  |  | 3.4 | 1.3 |

FIG. 5A

ENERGY LIMIT = 3 AND AGE >2

|  | COMMAND NUMBER | PRESENT AGE | ARRIVAL TIME | CCT | SEEK ENERGY |
|---|---|---|---|---|---|
| CURRENT | 2 | 0.2 | 0.92 | 1.1 | 1.3 |
| FUTURE | 3 | -0.1 | 1.77 | 1.7 | 0.1 |
| CURRENT | 1 | 2.5 | 2.38 | 4.9 | 1.2 |
| FUTURE | 4 | -0.2 | 3.56 | 3.4 | 1.0 |
| AVERAGE |  |  |  | 2.8 | 0.9 |
| TAIL |  |  |  | 4.9 | 1.3 |

FIG. 5B

POWER LATENCY CONTROL IN DATA STORAGE DEVICES

SUMMARY

In one embodiment, a data storage device is provided. The data storage device includes at least one data storage medium having a plurality of tracks. The data storage device also includes at least one actuator that supports at least one head that is configured to interact with different tracks of the plurality of tracks on the at least one data storage medium to service commands from a host. The data storage device further includes a seek control circuit communicatively coupled to the at least one actuator. The seek control circuit is configured to store the commands from the host in at least one queue for execution by the at least one actuator. The seek control circuit is also configured to adjust power provided to the at least one actuator for seek operations to the different tracks the plurality of tracks based on command age-related measurements of the commands from the host.

In another embodiment, a method is provided. The method includes determining, by a seek control circuit, seek speeds for commands based on a comparison of command age-related measurements of the commands with at least one predetermined command age-related measurement threshold. The method also includes performing seek operations for the commands based on the determined seek speeds.

In yet another embodiment, a data storage device is provided. The data storage device includes at least one data storage medium having a plurality of tracks. The data storage device also includes first and second actuators that support respective first and second heads that are configured to interact with different tracks of the plurality tracks on the at least one data storage medium to service commands from a host. The data storage device further includes a seek control circuit communicatively coupled to the first and second actuators. The seek control circuit is configured to store first ones of the commands from the host in a first queue for execution by the first actuator, and store second ones of the commands from the host in a second queue for execution by the second actuator. The seek control circuit is further configured to adjust power provided to the first and second actuators for seek operations to the different tracks of the plurality of tracks based on command age-related measurements of the commands from the host.

This summary is not intended to describe each disclosed embodiment or every implementation of power latency control in data storage devices as described herein. Many other novel advantages, features, and relationships will become apparent as this description proceeds. The figures and the description that follow more particularly exemplify illustrative embodiments.

BRIEF DESCRIPTION OF THE DRAWINGS

FIGS. 3A-3B, 4A-4B and 5A-5B are tables having values associated with the commands shown in FIG. 2.

DETAILED DESCRIPTION OF ILLUSTRATIVE EMBODIMENTS

Figure 1:
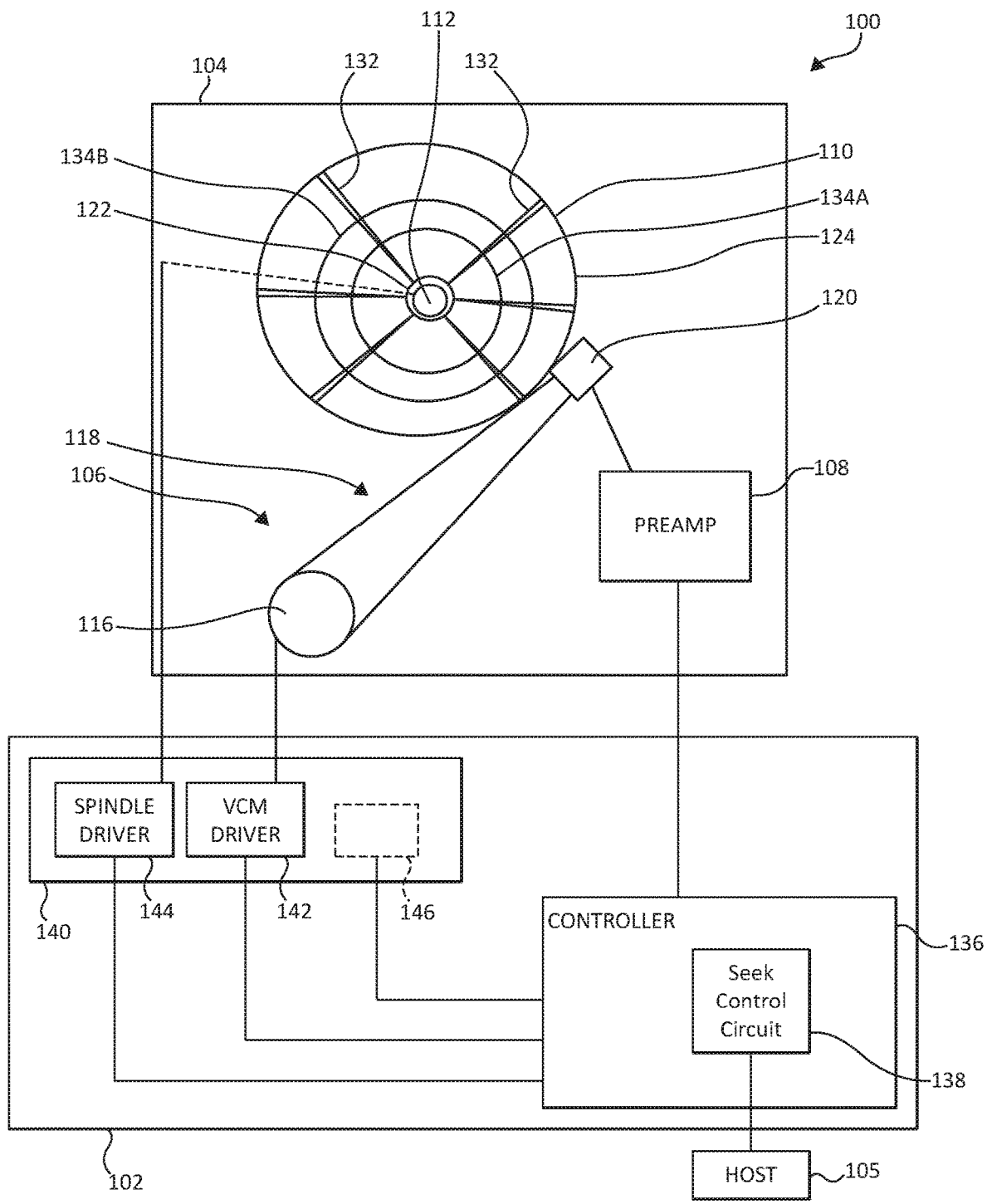
FIG. 1 is a diagrammatic illustration of a hard disc drive (HDD) in which seek power management is carried out in accordance with one embodiment.

Embodiments of the disclosure generally relate to techniques for reducing power consumption in a data storage device (e.g., a hard disc drive (HDD) or a hybrid drive). A reduction in operational drive power can help cloud service providers reduce both their carbon footprint to meet sustainability goals and their total cost of ownership (TCO) to improve their bottom line.

To achieve such a reduction in operational power in HDDs or hybrid drives, embodiments of the disclosure employ command age information to use less seek and spindle power on average while controlling for tail latency. In such embodiments, some seeks are intentionally slowed down and others are intentionally sped up. To accommodate the slowing of some seeks and the speeding up of other seeks such that less seek and spindle power on average is used, "head room" in different forms is provided in different embodiments.

Typical HDDs include a single actuator that supports heads that are used to carry out read/write operations in response to receiving commands from a host. When workloads are high, commands are queued and executed based on a target command completion time (CCT) distribution. Since a single actuator is employed, all commands in the queue are serviced by that actuator. Thus, such HDDs operate at or near their maximum available seek power to achieve the target CCT distribution or input/output operations per second (IOPS).

In HDD embodiments of the disclosure that employ a single actuator, head room for using less seek and spindle power on average is provided by reducing TOPS relative to the TOPS provided by the above-described HDDs, which operate at or near their maximum available seek power to achieve the required CCT distribution. Embodiments of the disclosure with reduced TOPS may be suitable for archive HDDs, by way of example only and not limitation.

In other embodiments of the disclosure, head room for some seeks to be slowed down and others to be sped up to use less seek and spindle power on average is provided by including one or more additional actuators in the HDD. As will be shown in an example provided below, such embodiments do not reduce TOPS relative to the TOPS provided by the above-described typical single-actuator HDDs, which operate at or near their maximum available seek power to achieve the target CCT distribution.

In an example case where there are 16 pending commands in a queue of a typical single-actuator HDD, all 16 commands will be executed by the same actuator operating at or near the maximum available seek power to achieve the target CCT distribution. In an example dual-actuator HDD embodiment of the disclosure, the 16 commands can be split into 2 queues with, for example, 8 commands per queue, with each 8-command queue being serviced by a different one of the two actuators. Thus, the CCT distribution or TOPS provided by the typical single-actuator HDD operating at or near the maximum available seek power can be met with slower (lower-power) seeks since each actuator has only 8 commands to service. The resulting seek power savings follows $P=i^2R$ (where P is power, i is current, and R is resistance), thereby reduced by a power of 2. The cost of the dual-actuator will be more than offset by TCO improvements obtained from power savings during the service life of the dual-actuator HDD and the corresponding infrastructure savings. Prior to providing details regarding the different embodiments, a description of an illustrative operating environment is provided below.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a HDD 100 in which power management can be carried out in accordance with embodiments of the disclosure. HDD 100 includes a printed circuit board assembly (PCBA) 102 and a head disc assembly (HDA) 104. PCBA 102 includes circuitry and processors, which control elements of HDA 104 and also provide an interface controller for communicating between a host system 105 and HDA 104.

HDA 104 includes an actuator assembly 106, a preamplifier 108, and at least one disc 110. The disc 110 is mounted on a spindle 112. Spindle 112 is mechanically coupled to a spindle motor (not shown) for rotating the disc 110.

Actuator assembly 106 may include an actuator 116 that may be, for example, a motor, such as a voice coil motor (VCM), and one or more arms 118, with each different arm associated with a different disc 110 surface. It should be noted that arm 118 is shown as a single piece in the interest of simplification. In different embodiments, arm 118 may include multiple pieces with elements such as micro-actuators, which are not shown. A transducer or head 120 is mounted on a distal portion of arm 118. The transducer 120 may, for example, include at least one read element (e.g., a magneto resistive (MR) element) and/or a write element.

Actuator (e.g., VCM) 116 can pivot the actuator arm about a bearing (not shown) to position the head 120 with respect to the disc 110. In particular, the actuator 116 positions the transducer 120 to allow it to access data tracks on the disc 110 surface. Accordingly, the actuator 116 can position transducers 120 over a range of movement that may correspond to the distance between an inner diameter 122 and an outer diameter 124 of the disc 110 surface. A plurality of data storage tracks are included between the inner diameter 122 and the outer diameter 124. In the interest of simplification, two example tracks 134A and 134B are shown, but a typical disc 110 surface includes numerous tracks.

The disc 110 surface may also include servo wedges 132 having data (e.g., encoded patterns) that are used to detect the location of head 120 relative to the disc 110 surface. Servo data read from servo wedges 132 by transducer or head 120 is used by control circuitry described further below to move the head 120 to addressed tracks 134A, 134B on the disc 110 surface in response to the read/write commands (seek mode). While data is being written to and/or read from the disc 110 surface the servo data is also used to maintain the read/write head 120 aligned with the track 134A, 134B (track following mode). As indicated above, embodiments of the disclosure relate to controlling seek power, and therefore elements of PCBA 102 that help carry out seek operations and carry out seek power control are described below.

As can be seen in FIG. 1, PCBA 102 includes a controller 136, which includes a seek control circuit 138, and driver circuitry 140 that includes a VCM driver 142 and a spindle driver 144. Seek control circuit 138 may include multiple modules (e.g., a command scheduling module, a seek servo control module and a feedback control module), which are described in detail further below.

During operation, commands (e.g., read and/or write requests) from host 105 are received at HDD 100. The received commands may be ordered in a queue within seek control circuit 138. Also, in seek control circuit 138, age information for each command may be determined (e.g., by calculations based on arrival time of the command in the HDD 100, by stochastic prediction methods, from queue depth, etc.) The command age information is utilized within seek control circuit 138 to determine seek energy targets, and, based on the seek energy targets, seek current/voltage values are provided by seek control circuit 138 to VCM driver 142. Upon receiving the current/voltage values, the VCM driver 142 provides a corresponding VCM current that adjusts a position of VCM 116, thereby completing a seek operation to a target track (e.g., 134A, 134B) at which a read/write operation may be carried out.

In some embodiments, a seek power measurement sensor 146 may be included in driver circuitry 140. In such embodiments, seek power values obtained by sensor 146 are provided to seek control circuit 138, and may be utilized along with the command age information to determine seek energy targets. In some embodiments, seek control circuit 138 also provides a spindle motor driving current value to spindle driver 142, which provides a current output to the spindle motor (not shown) for rotating disc 110 at a substantially constant rate of speed.

Once the head 120 is positioned over the target/destination track 134A, 134B and sector between wedges 132, data may be read from or written to the disc 110. During read/write operations, head 120 also reads servo information when it is positioned over a servo wedge 132. Analog signals for the head 120 are provided to preamplifier 108. It general, preamplifier 108 amplifies the analog signals from head 120 (obtained from reading user and servo data) and provides the amplified signals to controller 136. In the interest of brevity, additional details regarding preamplifier 108, its communication with controller 136 and the communication of the data to the host 105 are not provided.

To explain how making seek power a function of command age helps reduce operational power in a HDD such as 100, a 4-command example is provided below in connection with FIGS. 2-5B.

Figure 2:
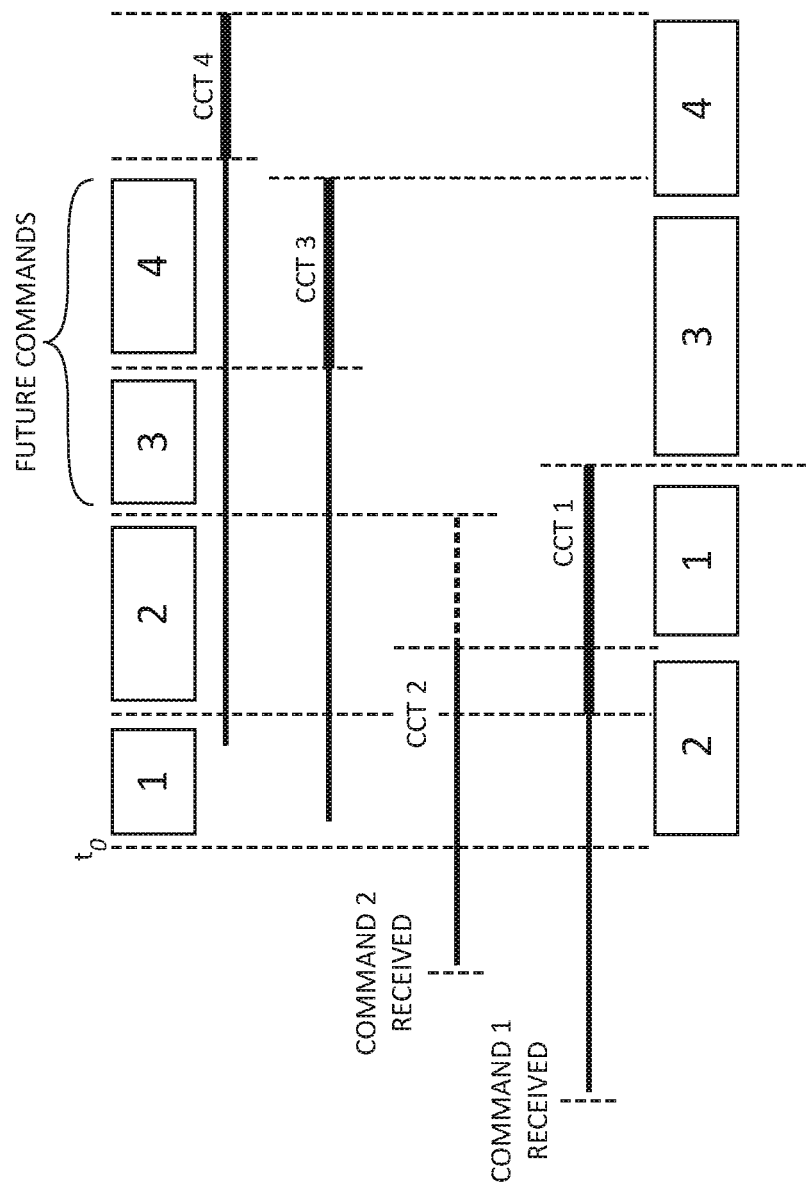
FIG. 2 is a diagrammatic illustration showing an order of execution of commands in accordance with one embodiment.

FIG. 2 is a diagrammatic illustration showing 4 commands labeled 1-4 along a time axis. Since the disc (e.g., 110 of FIG. 1) is rotated at a constant speed by the spindle motor, the unit of time used in the example of FIG. 2 is a disc revolution. In this example, $t_0$ is a current time. Commands 1 and 2 are received prior to $t_0$ and therefore are already in the queue. Consider command 1 to have a very high seek energy. Also, the example considers that there is a potential upcoming burst of two more commands (3 and 4) in the near future, sometime after the next seek is issued. The CCTs of commands 1, 2, 3 and 4 are CCT1, CCT2, CCT3 and CCT4, respectively.

The top of FIG. 2 shows that, when the commands 1, 2, 3, and 4 are sorted in arrival order (1 2 3 4) for carrying out seek operations, the seek power is high. However, selecting command 2 over command 1 (e.g., sorting the commands in order 2 1 3 4 as shown at the bottom of FIG. 2) can result in reduced seek energy at the expense of CCT1 and CCTs 3 and 4. Here, command 1 is completed with less power, but increased CCT.

FIGS. 3A-5B include tables with example present age values, arrival time values, CCT values and seek energy values for commands 1-4 of FIG. 2. A disc revolution is the unit for all time quantities in the tables of FIGS. 3A-5B, and the unit of seek energy is a Joule (J).

FIGS. 3A and 3B provide an example of seek energy versus CCT tail tradeoff. In the table of FIG. 3A, there is no energy limit placed on the seeks, and the command present age is less than 1. As noted above in the description of FIG. 2, commands 3 and 4 are future commands. Thus, yet-to-arrive commands 3 and 4 have negative ages in the table of FIG. 3A (and in the tables of FIGS. 3B-5B, which are described below). Without any seek energy limits, command 1 has a seek energy of 4 J, and the average seek energy is 1.8 J. The average CCT is 1.4 disc revolutions and the CCT tail is 2.4 disc revolutions, which is the CCT of command 4.

In the table of FIG. 3B, an energy limit of 3 J is placed on the seeks, and the command present age is less than 1 as in the table of FIG. 3A. As can be seen in FIG. 3B, placing the energy limit of 3 J results in a substantial decrease in average seek energy (0.9 J, which is half the average seek energy in FIG. 3A). However, the average CCT is 2.3 disc revolutions (0.9 disc revolutions greater than FIG. 3A) and the CCT tail is 3.4 disc revolutions (one disc revolution greater than FIG. 3A). In general, placing a limit on seek energy can dramatically reduce the overall seek power, but it usually results in increased tails in CCT.

FIGS. 4A and 4B include tables with information that demonstrates an effect of command age on latency without energy considerations. Accordingly, in FIGS. 4A and 4B, there is no seek energy limit. In FIG. 4A, command age is less than 1 and, in FIG. 4B, command age is greater than 2. From the data in FIGS. 4A and 4B, it is seen that, when commands are sorted simply for fastest access time (e.g., sorted based on arrival time), seek power is elevated, but the tail CCT (2.4 disc revolutions in FIG. 4A and 2.9 disc revolutions in FIG. 4B) is well-controlled.

FIGS. 5A and 5B include tables with information that demonstrates an effect of command age on latency with energy considerations. In FIGS. 5A and 5B, the seek energy limit is 3 J. A comparison of tail data of FIG. 4A with tail data of FIG. 5A shows that, when the command age is low, a lower-power sort (change in command sort from 1234 in FIG. 4A to 2314 in FIG. 5A) results in a slight increase in CCT tails (from 2.4 in FIG. 4A to 3.4 in FIG. 5A, which is an increase of 1 disc revolution). However, a comparison of tail data of FIG. 4B with tail data of FIG. 5B shows that, when the command age is high, choosing the lower-power sort (change in command sort from 1234 in FIG. 4B to 2314 in FIG. 5B) results in a relatively large increase in CCT tails (from 2.9 in FIG. 4B to 4.9 in FIG. 5B, which is an increase of 2 disc revolutions). Thus, in embodiments of the disclosure, relatively low seek energy may be employed when command age is low, and relatively high seek energy may be employed when command age is high to limit tails. An example method embodiment is described below in connection with FIG. 6.

Figure 6:
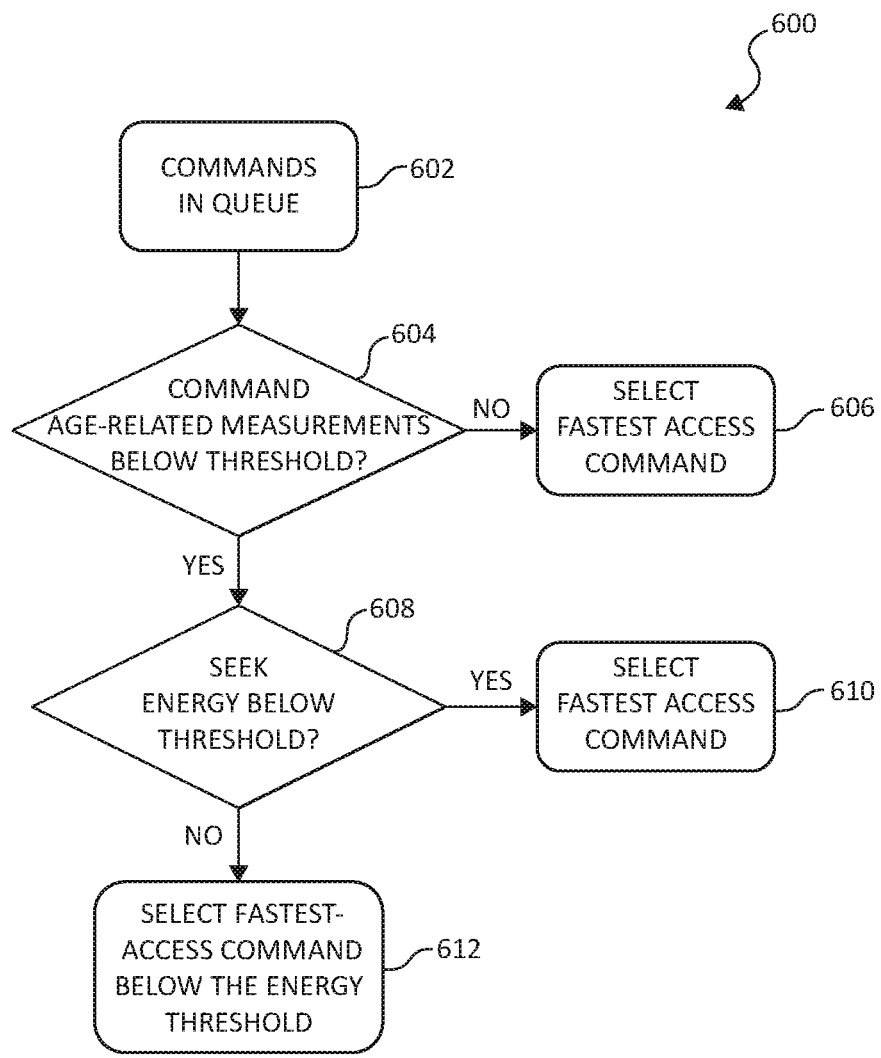
FIG. 6 is a flow diagram of a method embodiment.

FIG. 6 is a flowchart of a method 600 in accordance with one embodiment. In method 600, block 602 represents commands in a queue. At 604, a determination is made as to whether command age-related measurements are below at least one predetermined command age-related measurement threshold. The command age-related measurements may include different measured/computed/determined age-related values or quantities of one or more commands. Examples of such values or quantities include an age of a single command, multiple command ages, an aggregate age of all commands in a queue, queue depth of commands, an average age of commands in the queue, etc. The different command age-related measurements may be compared to corresponding different predetermined command age-related measurement thresholds (e.g., one or more predetermined command age thresholds, a predetermined average/aggregate command age threshold, a predetermined queue depth threshold, etc.). If the command age-related measurements are greater than or equal to the predetermined command age-related measurement threshold(s), a fast or fastest seek access for the command(s) is selected at 606 (to expedite servicing of the queue and minimize a risk of high tail CCTs). If the command age-related measurements are less than the predetermined command age-related measurement threshold, at 608, a determination is made as to whether command seek energy is below a predetermined command seek energy threshold. If the command seek energy is less than the predetermined command seek energy threshold, the fast or fastest seek access for the command(s) is selected at 610 (to keep the queue small and allow for future energy savings). If the command seek energy is greater than or equal to the predetermined command seek energy threshold, a fast or fastest seek access for the command is selected at 612 (to reduce seek energy with low risk of elevated CCTs in the near future).

Figure 7:
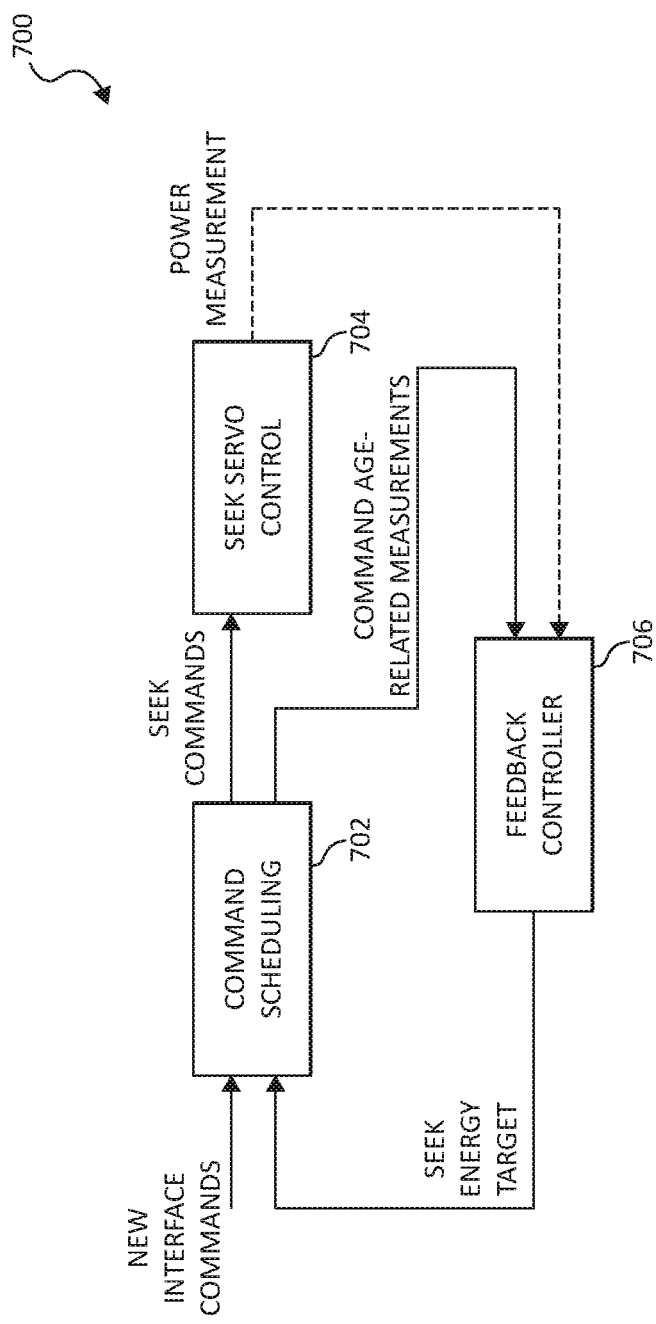
FIG. 7 is a block diagram of a seek control circuit that is capable of implementing the method of FIG. 6 in accordance with one embodiment.

FIG. 7 is a block diagram of a seek control circuit 700 that is capable of implementing the method of FIG. 6 in accordance with one embodiment. As can be seen in FIG. 7, seek control circuit 700 includes a command scheduling module 702, a seek servo control module 704 and a feedback control module 706. In command scheduling module 702, commands (e.g., read and/or write requests) received from a host (such as 105 of FIG. 1) may be ordered in a queue. Also, in command scheduling module 702, age information (e.g., command age-related measurements) for each command may be determined (e.g., by calculations based on arrival time of the command in the HDD, by stochastic prediction methods, from queue depth, etc.) The command age information may be fed to feedback control module 706, which determines seek energy targets for the different commands and provides the seek energy targets to the command scheduling module 702, which outputs seeks commands to seek servo-control module 704 according to the received seek energy targets. In response to receiving the seek commands, seek servo control circuit 704 provides seek current/voltage values to a VCM driver (such as 142 of FIG. 1). Is should be noted that, in some embodiments, seek power values (obtained, for example, by seek power measurement sensor 146 of FIG. 1) may be utilized along with the command age information to determine the seek energy targets.

As noted earlier, head room for some seeks to be slowed down and others to be sped up to use less seek and spindle power on average may be provided by including one or more additional actuators in the HDD. In a dual-actuator drive, for example, the CCT distribution or IOPS provided by a single-actuator HDD can be met with slower (lower-power) seeks since each of the two actuator has fewer commands (e.g., half the commands received in the HDD) to service. Example dual-actuator drives in which a seek control circuit of the type shown in FIG. 7 may be employed are described below in connection with FIGS. 8A and 8B.

Figure 8A:
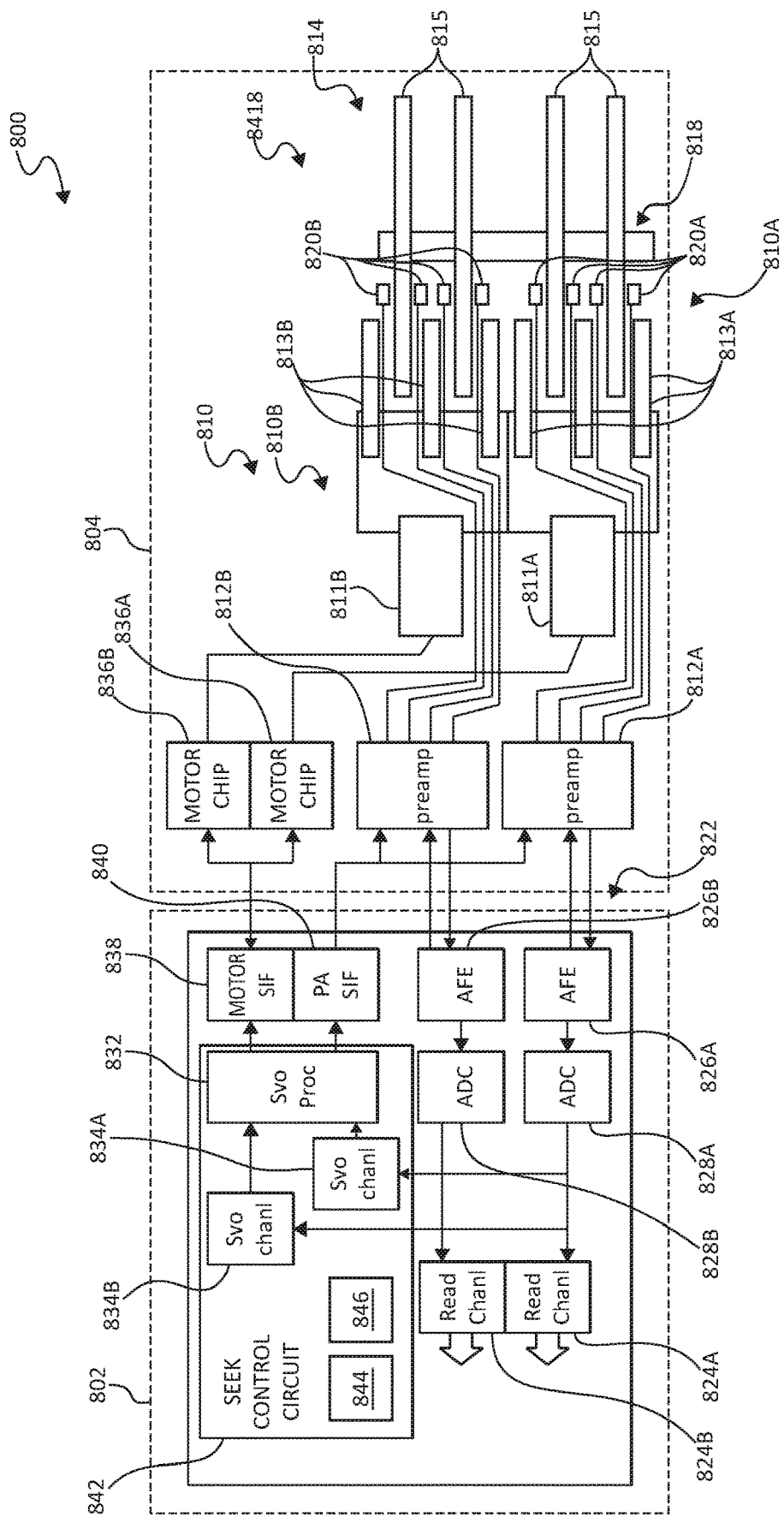
FIG. 8A is a block diagram of a dual-actuator, dual-channel drive in accordance with one embodiment.

FIG. 8A is a block diagram of a dual-actuator, dual-channel drive 800 in accordance with one embodiment. Drive 800 includes electronics 802 and a head-disc assembly (HDA) 804. Electronics 802, which may be incorporated into a single SOC, include circuitry and processors that form a part of a target interface controller (or drive controller) for communicating between a host system (not shown) and HDA 804. The host system can include a microprocessor-based data processing system such as a personal computer or other system capable of performing a sequence of logical operations. Data is transmitted between the host system and electronics 802 via a host bus connector and other circuitry, which are not shown in the interest of simplification. HDA 804 includes a dual actuator assembly 810 having individual actuator sub-assemblies 810A and 810B, a first preamplifier circuit 812A connected to the first actuator sub-assembly 810A, a second preamplifier circuit 812B connected to the second actuator sub-assembly 810B, and a disc assembly 814. Disc assembly 814 includes one or more media discs 815, stacked on a spindle assembly 818. Spindle assembly 818 is mechanically coupled to a spindle motor (not shown) for rotating the disc(s) 815. First and second actuator sub-assemblies 810A and 810B are show in FIG. 8 with a substantially common pivot point, but in some embodiments first and second actuator sub-assemblies 810A and 810B may have separate pivot points. First and second actuator sub-assemblies 810A and 810B are show in FIG. 8 in a stacked configuration with 810B on top of 810A, but in some embodiments first and second actuator sub-assemblies 810A and 810B may be interlaced with each other such that multiple actuator arms 813A and 813B are alternatively part of first sub-assembly 810A and second sub-assembly 810B.

First actuator sub-assembly 810A includes a first voice coil motor (VCM) 811A, and first multiple actuator arms 813A. Second actuator sub-assembly 810B includes a second VCM 811B, and second multiple actuator arms 813B. Located at the end of each one of actuator arms 813A and 813B are one or more sliders/transducer heads such as 820A and 820B, which are associated with a respective disc surface. Transducer heads 820A and 820B communicate with electronics 802 via a cable assembly 822 connected to preamplifiers 812A and 812B for reading and writing data to the transducer head's associated disc surface. Analog front end (AFE) circuits 826A and 826B and analog-to-digital converter (ADC) circuits 828A and 828B are connected between preamplifiers 812A and 812B and read/write channels 824A and 824B, respectively. Preamplifier 812A is multiplexed to select a single one of heads 820A to perform a read/write operation. Similarly, preamplifier 812B is multiplexed to select a single one of heads 820B to perform a read/write operation. Preamplifiers 812A and 812B provide amplified signals to a read/write channels 824A and 824B, respectively, of electronics 802. Read/write channels 824A and 824B perform encoding and decoding of data written to and read from the discs 815.

Electronics 802 further includes a servo processor 832 that receives inputs from servo channels 834A and 834B and responsively provides output signals used for control operations. The servo processor 832 has a first output connected to servo controllers 836A and 836B via first interface 838, and has a second output connected to preamplifiers 812A and 812B via a second interface 840. The servo processor 832 provides intelligent control of actuator assembly 810 through servo controllers 836A and 836B. By commands issued to servo controllers 836A and 836B by servo processor 832, VCMs 811A and 811B move actuator sub-assemblies 810A and 810B, respectively. Servo channels 834A and 834B and servo processor 832 may be a part of a seek control circuit 842 that places some received commands in a first queue 844 to be serviced by the first actuator sub-assembly 810A, and other received commands in a second queue 846 to be serviced the second actuator sub-assembly 810B. Seek power control of the received commands in each of the two different queues 844, 846 is carried out in a manner described above in connection with FIGS. 6 and 7.

Figure 8B:
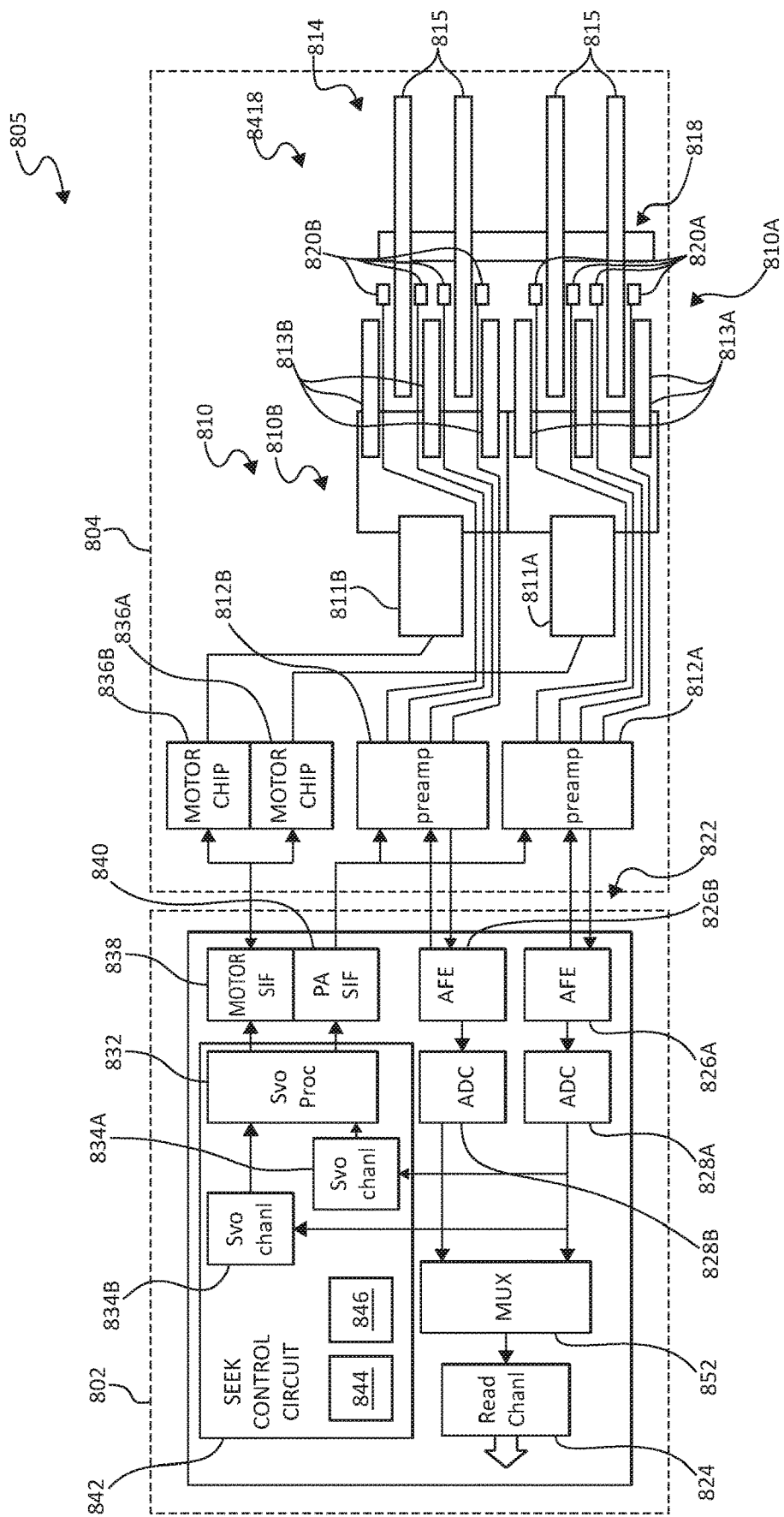
FIG. 8B is a block diagram of a dual-actuator, single-channel drive in accordance with one embodiment.

FIG. 8B is a block diagram of a dual-actuator, single-channel drive 850 in accordance with one embodiment. In drive 850, a single read/write channel 824 is employed instead of two read/write channels 824A and 824B (one for each different actuator sub-assembly 810A, 810B) employed in dual-actuator, dual-channel drive 800 of FIG. 8A. In drive 850, analog front end (AFE) circuits 826A and 826B, analog-to-digital converter (ADC) circuits 828A and 828B and a multiplexer (MUX) circuit 852 are connected between preamplifiers 812A and 812B and single read/write channel 824. Preamplifier 812A is multiplexed to select a single one of heads 820A to perform a read/write operation. Similarly, preamplifier 812B is multiplexed to select a single one of heads 820B to perform a read/write operation. Further, the selected one of heads 820A alternates with the selected one of heads 820B in performing read/write operations. Thus, if the selected one of heads 820A performs a read/write operation during a first disc revolution, the selected one of heads 820B is inactive during that revolution. However, during a second revolution, the selected one of heads 820B is active in performing the read/write operation and the selected one of heads 820A is inactive. Preamplifiers 812A and 812B provide amplified signals to a read/write channel 824 of electronics 802. Read/write channel 824 performs encoding and decoding of data written to and read from the discs 815. In other respects, drive 850 operates in a manner similar to drive 800 (of FIG. 8A) and therefore, in the interest of brevity, the similar description is not repeated.

Figure 9:
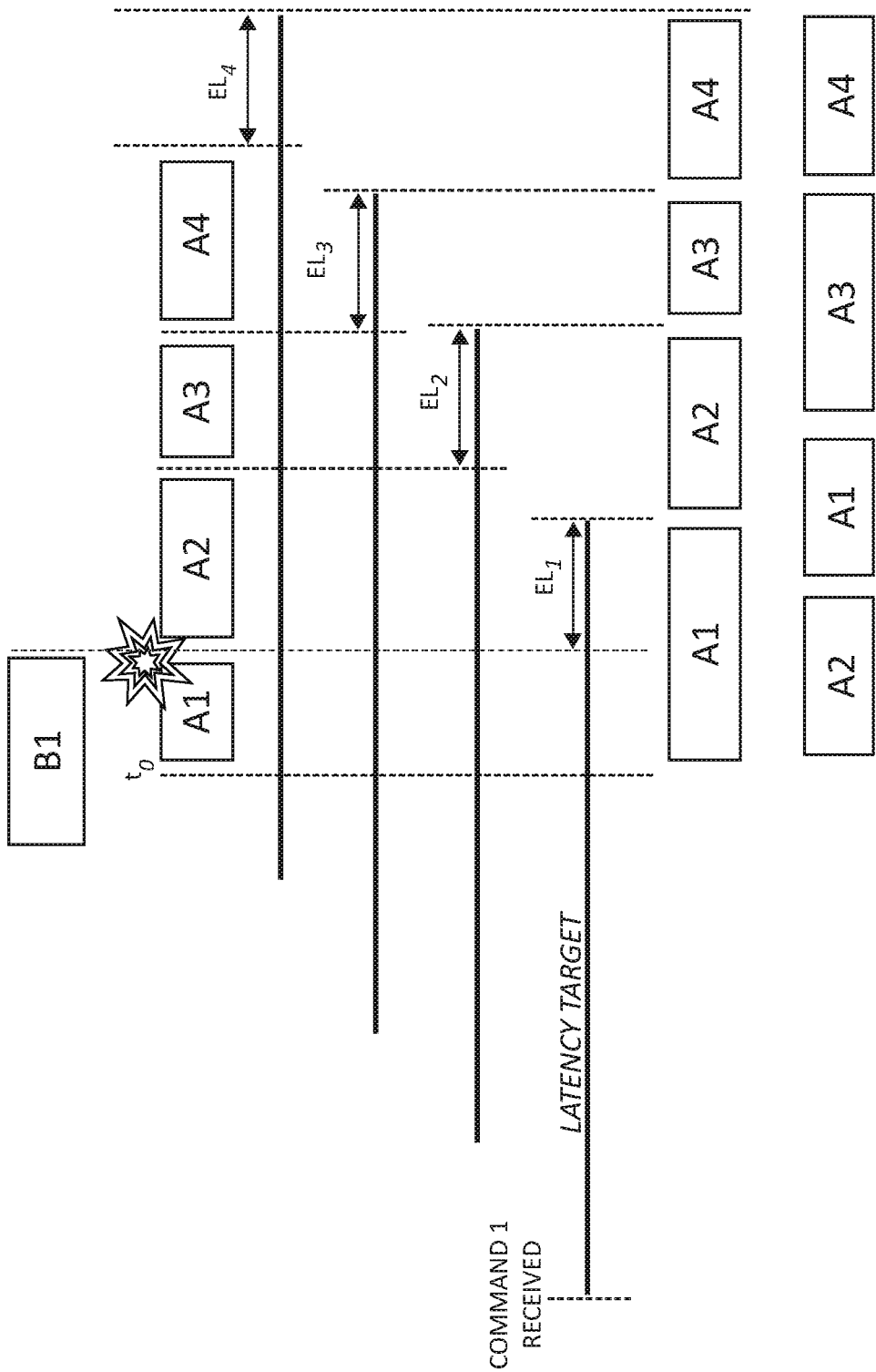
FIG. 9 is a diagrammatic illustration showing command collision avoidance with latency addition in a drive of the type shown in FIG. 8B.

FIG. 9 is a diagrammatic illustration showing command collision avoidance with latency addition in a data storage drive of the type shown in FIG. 8B. In FIG. 9, as in FIG. 2, the horizontal axis is a time axis, and $t_0$ is a current time. On a first one of two actuators (referred to as actuator A), each candidate command (e.g., each of commands A1, A2, A3 and A4) is evaluated for potential interference with an en-route command (e.g., B1) on the second actuator (referred to as actuator B). If there is any potential for interference, one revolution of latency is added prior to the sort of actuator A's commands to avoid collision with actuator B's command (e.g., B1). The additional or excess latencies are shown by $EL_1$, $EL_2$, $EL_3$ and $EL_4$. Once actuator B completes its command (e.g., B1) it likewise evaluates the en-route command on actuator A for interference with each of its candidate commands.

The above-described embodiments primary deal with data storage drives (e.g., HDDs) with single or multiple actuators. However, the principles of the disclosure are also applicable in hyperscale environments (e.g., cloud systems). One hyperscale example is described below in connection with FIG. 10.

Figure 10:
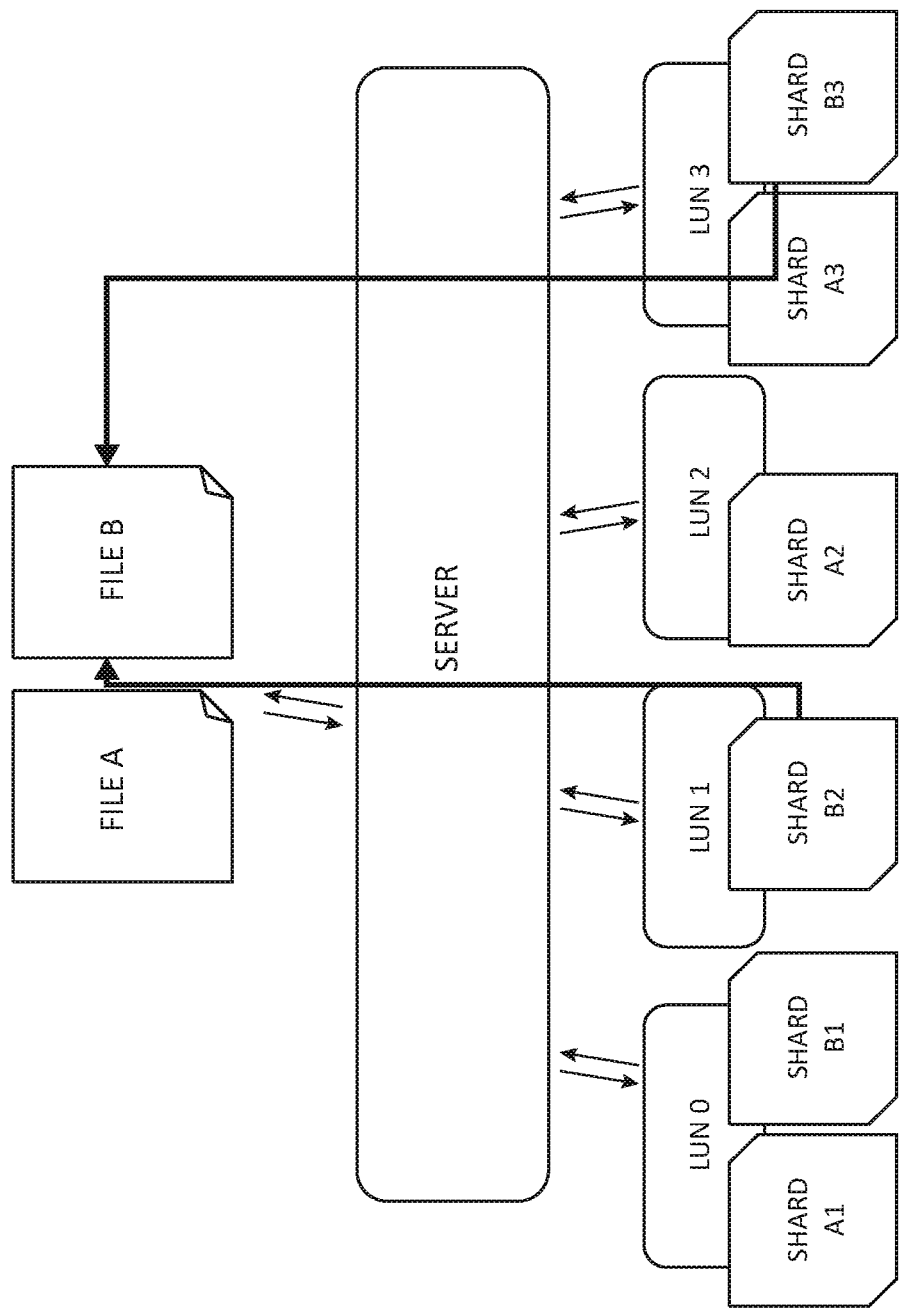
FIG. 10 is diagrammatic illustration of a cloud sharding model in accordance with one embodiment.

FIG. 10 is diagrammatic illustration of a cloud sharding model in accordance with one embodiment. The cloud sharding model of FIG. 10 employs forward error correction (FEC) based on a specified error coding scheme. FEC involves breaking down files into k+m shards, where the original file is broken into k shards with m shards for redundancy. For example, in FIG. 10, file A is broken up into shards A1, A2 and A3, and file B is broken up into shards B1, B2 and B2. A 2+1 error coding scheme is employed. With FEC, it is assumed that a file can be successfully accessed as soon as the first k shards are returned. Thus, an extreme tail in the m portion is not of concern in real-world applications that operate in this manner. The CCT is allowed to be longer as long as the k shards are returned in a predetermined amount of time. Thus, retrieval of some shards may be slowed as long as all k shards are returned within the predetermined amount of time. In FIG. 10, each logical unit number (LUN) 0, 1, 2 and 3 is an address of a single-actuator drive or an address of an actuator within a multi-actuator drive. Drives/actuators associated with the LUNs 0, 1, 2 and 3 in communication with a server are used for storage and retrieval of file shards.

Figure 11A:
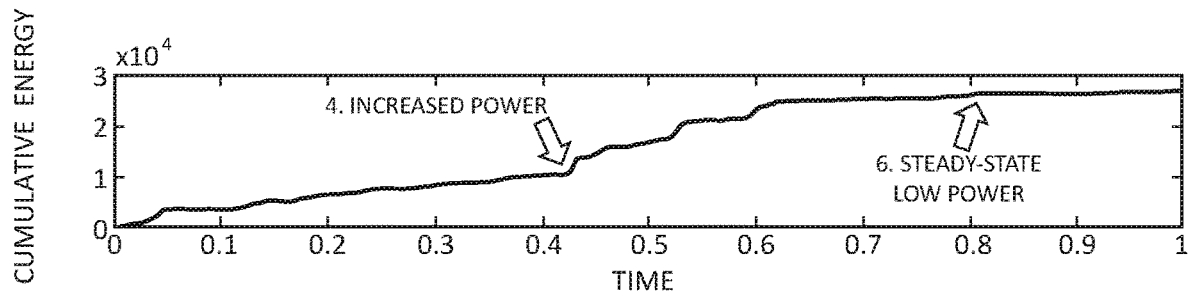
FIGS. 11A-11D are graphs of simulation results.
Figure 11B:
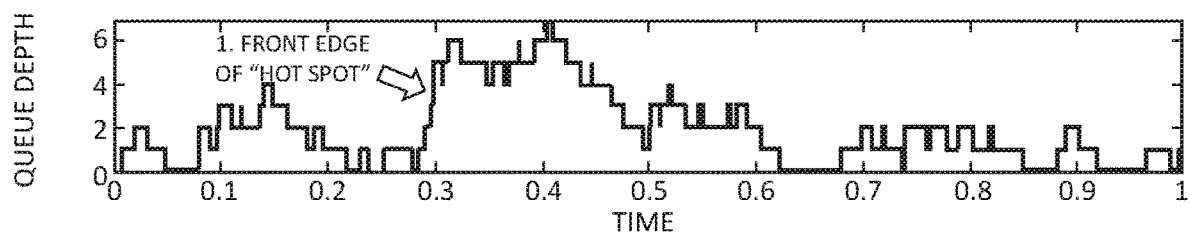
Figure 11C:
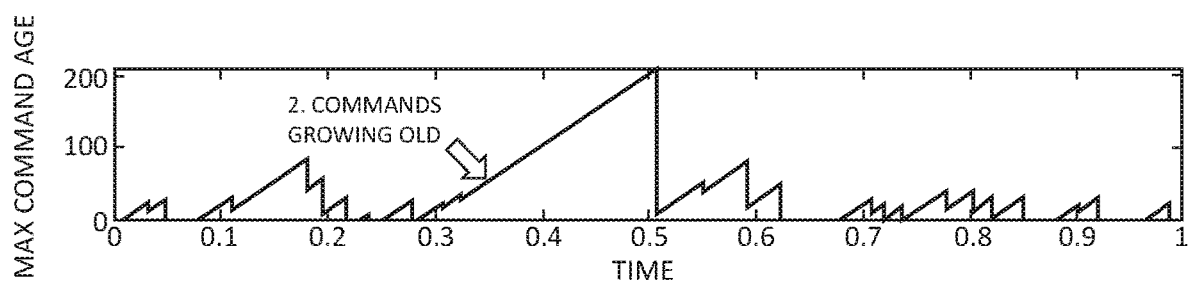
Figure 11D:
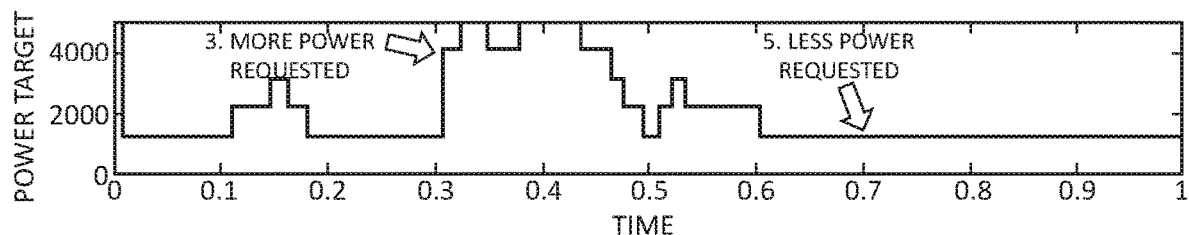

FIGS. 11A-11D include graphs of simulation results for a fleet size=100 LUNs, performance=4.3 IOPS/terabyte (TB), file size=4 megabytes (MB) and error coding=8+2. FIGS. 11A-11D have a common horizontal axis, which is normalized time, but have different vertical axes. In FIG. 11A, the vertical axis is cumulative energy. In FIG. 11B, the vertical axis is queue depth. In FIG. 11C, the vertical axis is maximum command age. In FIG. 11D, the vertical axis is a power target axis.

As can be seen in FIG. 11B, a front edge of a hot spot (e.g., substantially simultaneous receipt of a number of commands) is at approximately 0.3 on the normalized time axis. At that time, as can be seen in FIG. 11C, the commands begin to grow old. This results in more power being requested as shown in FIG. 11D, and a subsequent increase in overall power as shown in FIG. 11A.

The above-described embodiments are in reference to single and dual-actuator data storage devices. However, the concepts described above are extendable to more than 2 actuators (e.g., 3, 4, etc.).

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   at least one data storage medium having a plurality of tracks;
   at least one actuator that supports at least one head that is configured to interact with different tracks of the plurality of tracks on the at least one data storage medium to service commands from a host; and
   a seek control circuit communicatively coupled to the at least one actuator, the seek control circuit configured to:
   store the commands from the host in at least one queue for execution by the at least one actuator; and
   adjust power provided to the at least one actuator for seek operations to the different tracks of the plurality of tracks based on command age-related measurements of the commands from the host.

2. The data storage device of claim 1 and wherein:
   the at least one actuator comprises first and second actuators;
   the at least one head comprises a first head supported by the first actuator and a second head supported by the second actuator;
   the at least one queue comprises first and second command queues; and
   the seek control circuit is further configured to:
   store some of the commands from the host in the first command queue for execution by the first actuator, and store other ones of the commands from the host in the second queue for execution by the second actuator; and
   adjust the power provided to the first and second actuators for the seek operations to the different tracks of the plurality of tracks based on the command age-related measurements of the commands from the host.

3. The data storage device of claim 2 and further comprising a read channel, wherein both the first head supported by the first actuator and the second head supported by the second actuator are communicatively coupled to the read channel.

4. The data storage device of claim 2 and further comprising first and second read channels, wherein the first head supported by the first actuator is communicatively coupled to the first read channel, and wherein the second head supported by the second actuator is communicatively coupled to the second read channel.

5. The data storage device of claim 1 and wherein the seek control circuit comprises:
   a command scheduling module comprising the at least one queue, the command scheduling module configured to determine an order in which seek operations to the different tracks of the plurality of tracks are to be performed based on the command age-related measurements of the commands from the host;
a servo seek control module configured to control performance of the seek operations in the order determined by the command scheduling module; and
a feedback control module configured to receive command age information from the command scheduling module and to responsively determine seek energy targets for the commands.

6. The data storage device of claim 5 and wherein the command scheduling module is further configured to receive the seek energy targets and to determine the order in which the seek operations to the different tracks of the plurality of tracks are to be performed based on the seek energy targets.

7. The data storage device of claim 6 and wherein the command scheduling module is further configured to determine the order in which the seek operations to the different tracks of the plurality of tracks are to be performed based on a comparison between the seek energy targets and a predetermined seek energy threshold.

8. The data storage device of claim 5 and wherein the command scheduling module is further configured to determine the order in which the seek operations to the different tracks of the plurality of tracks are to be performed based on a comparison between the command age-related measurements of the commands and at least one predetermined command age-related measurement threshold.

9. A method comprising:
determining, by a seek control circuit, seek speeds for commands based on a comparison of command age-related measurements of the commands with at least one predetermined command age-related measurement threshold; and
performing seek operations for the commands based on the determined seek speeds.

10. The method of claim 9 and further comprising:
receiving in a data storage device the commands from a host;
queuing the received commands;
determining the seek speeds for the received commands based on a comparison of command age-related measurements of the received commands with the at least one predetermined command age-related measurement threshold; and
performing the seek operations for the received commands based on the determined seek speeds.

11. The method of claim 10 and further comprising, when the command age-related measurements of the received commands are below the at least one predetermined command age-related measurement threshold, executing the commands at a first seek speed.

12. The method of claim 11 and further comprising, when the command age-related measurements of the received commands are greater than or equal to the at least one predetermined command age-related measurement threshold, comparing seek energy targets of the received commands with a predetermined seek energy threshold.

13. The method of claim 12 and further comprising, when the seek energy targets of the received commands are below the predetermined seek energy threshold, executing the commands at the first seek speed.

14. The method of claim 13 and further comprising, when the seek energy targets of the received commands are greater than or equal to the predetermined seek energy threshold, executing the seek energy commands at a second seek speed which is limited by the seek energy threshold.

15. A data storage device comprising:
at least one data storage medium having a plurality of tracks;
first and second actuators that support respective first and second heads that are configured to interact with different tracks of the plurality of tracks on the at least one data storage medium to service commands from a host; and
a seek control circuit communicatively coupled to the first and second actuators, the seek control circuit configured to:
store first ones of the commands from the host in a first queue for execution by the first actuator, and store second ones of the commands from the host in a second queue for execution by the second actuator; and
adjust power provided to the first and second actuators for seek operations to the different tracks of the plurality of tracks based on command age-related measurements of the commands from the host.

16. The data storage device of claim 15 and further comprising a read channel, wherein both the first head supported by the first actuator and the second head supported by the second actuator are communicatively coupled to the read channel.

17. The data storage device of claim 15 and further comprising first and second read channels, wherein the first head supported by the first actuator is communicatively coupled to the first read channel, and wherein the second head supported by the second actuator is communicatively coupled to the second read channel.

18. The data storage device of claim 15 and wherein the seek control circuit comprises:
a command scheduling module comprising the first and second queues, the command scheduling module configured to determine a first order in which seek operations to the different tracks of the plurality of tracks are to be performed based on the command age-related measurements of the first ones of the commands in the first queue and a second order in which seek operations to the different tracks of the plurality of tracks are to be performed based on the command age-related measurements of the second ones of the commands in the second queue;
a servo seek control module configured to control performance of the seek operations in the first order and the second order determined by the command scheduling module; and
a feedback control module configured to receive command age information from the command scheduling module and to responsively determine seek energy targets for the commands.

19. The data storage device of claim 18 and wherein the command scheduling module is further configured to receive the seek energy targets and to determine the order in which the seek operations to the different tracks of the plurality of tracks are to be performed based on the seek energy targets.

20. The data storage device of claim 19 and wherein the command scheduling module is further configured to determine the order in which the seek operations to the different tracks of the plurality of tracks are to be performed based on a comparison between the seek energy targets and a predetermined seek energy threshold.

* * * * *